(12) United States Patent
Gooden

(10) Patent No.: US 8,608,401 B2
(45) Date of Patent: Dec. 17, 2013

(54) MODULATED STRUCTURAL CELL FOR SUPPORTING A TREE ROOT NETWORK

(76) Inventor: Ben Gooden, Singleton (AU)

( * ) Notice: Subject to any disclaimer, the term of this patent is extended or adjusted under 35 U.S.C. 154(b) by 0 days.

(21) Appl. No.: 13/390,317

(22) PCT Filed: Aug. 13, 2010

(86) PCT No.: PCT/AU2010/001034
§ 371 (c)(1),
(2), (4) Date: Feb. 13, 2012

(87) PCT Pub. No.: WO2011/017766
PCT Pub. Date: Feb. 17, 2011

(65) Prior Publication Data
US 2012/0141203 A1 Jun. 7, 2012

(30) Foreign Application Priority Data

Aug. 14, 2009 (AU) ................................ 2009903817

(51) Int. Cl.
*E01C 5/00* (2006.01)
*A01G 13/02* (2006.01)
(52) U.S. Cl.
USPC .............................. 404/40; 47/32.4; 47/32.7
(58) Field of Classification Search
USPC ......... 404/29, 31, 33–36, 40–41; 47/32, 32.4, 47/32.7, 33; 405/36; 206/505, 507
See application file for complete search history.

(56) References Cited

U.S. PATENT DOCUMENTS

| 3,802,790 | A | * | 4/1974 | Blackburn ...................... 404/82 |
| 3,948,190 | A | * | 4/1976 | Cook et al. .................... 108/53.3 |
| 4,118,892 | A | * | 10/1978 | Nakamura et al. ............. 47/65.9 |
| 4,622,775 | A | | 11/1986 | Glenn et al. |
| 4,665,645 | A | | 5/1987 | Schau et al. |
| D319,291 | S | | 8/1991 | Hanzel |
| 5,371,967 | A | | 12/1994 | Albrecht |
| 5,460,867 | A | * | 10/1995 | Magnuson et al. ........... 428/178 |

(Continued)

FOREIGN PATENT DOCUMENTS

| EP | 1932975 | | 6/2008 |
| EP | 1932975 | A1 | 6/2008 |
| FR | 2547561 | A1 * | 12/1984 |
| WO | 2011017766 | | 2/2011 |

OTHER PUBLICATIONS

City Green. Root Director C. Series. 2011. http://www.citygreen.com/products/root-management/root-director-c-series/.

*Primary Examiner* — Thomas B Will
*Assistant Examiner* — Abigail A Risic
(74) *Attorney, Agent, or Firm* — Dowell & Dowell, P.C.

(57) ABSTRACT

A modulated cell adapted to form a structural frame of said cells for supporting a load bearing feature of a roadway, pavement or walkway while at the same time providing a rooting area within the structural frame for a tree root network. The cell has a main body with vertical integral legs with a top plate having regions upon its upper skirting for a snap fit fastening arrangement for receiving the ends of said legs of a resting cell thereupon said top plate to mount one cell vertically upon another and the top plate has its peripheral edge an interlocking means for laterally joining together with adjacent cells so the modulated cells can be mounted vertically and laterally one upon the other and side by side.

6 Claims, 9 Drawing Sheets

(56) References Cited

U.S. PATENT DOCUMENTS

Figure 1:
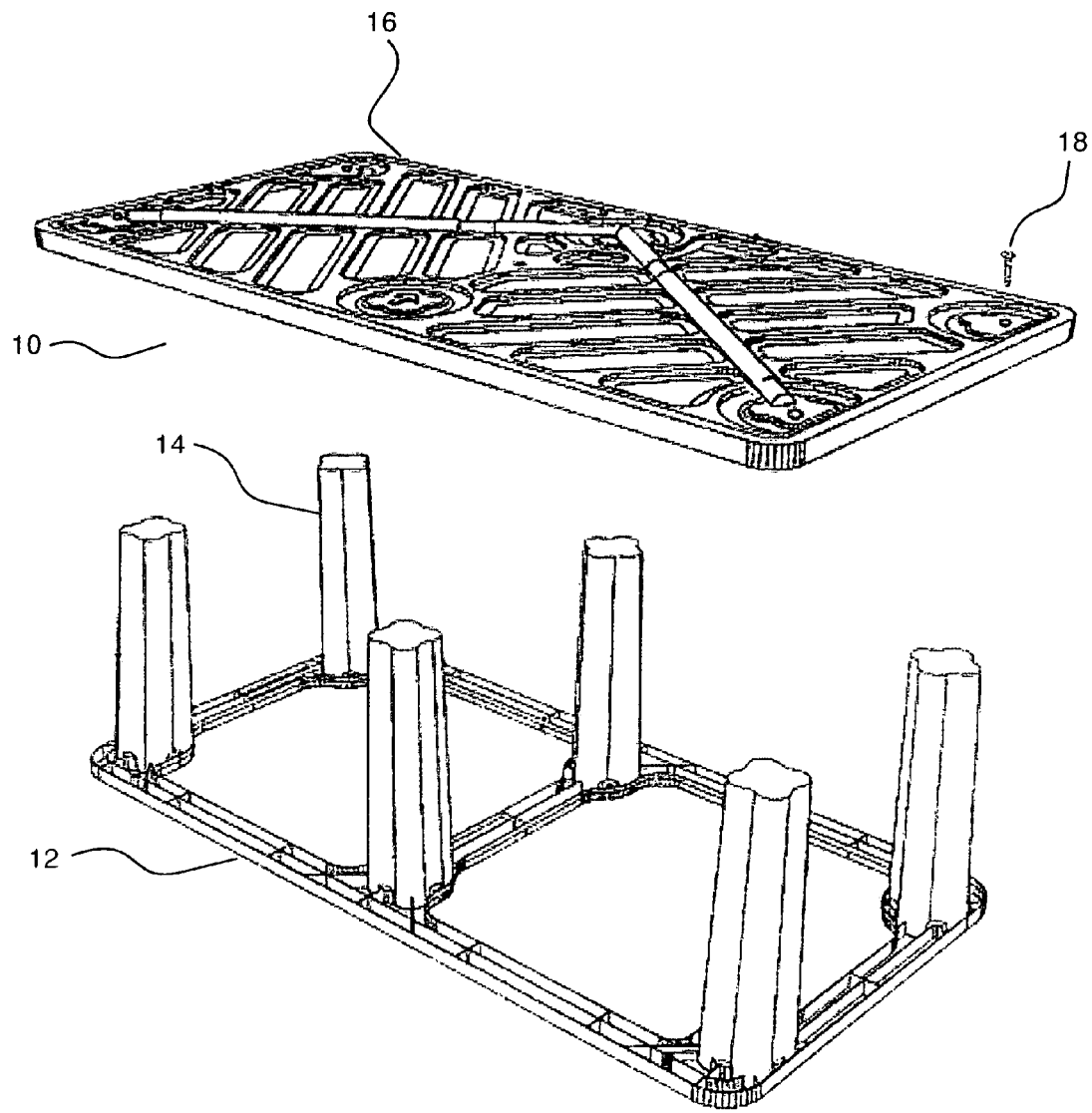

| | | | |
|---|---|---|---|
| D424,386 S | 5/2000 | Lundeen et al. | |
| 6,428,870 B1* | 8/2002 | Bohnhoff | 428/44 |
| 6,962,464 B1* | 11/2005 | Chen | 405/43 |
| 7,080,480 B2 | 7/2006 | Urban et al. | |
| 7,201,538 B2* | 4/2007 | Blackwood et al. | 405/50 |
| D560,469 S | 1/2008 | Bartol et al. | |
| D572,342 S | 7/2008 | Huang | |
| 7,621,695 B2* | 11/2009 | Smith et al. | 405/43 |
| D607,547 S | 1/2010 | Maier et al. | |
| 8,065,834 B2 | 11/2011 | Eckert | |
| 2008/0115413 A1* | 5/2008 | Blackmore | 47/65.7 |
| 2008/0166182 A1 | 7/2008 | Smith et al. | |
| 2009/0250369 A1* | 10/2009 | Guibert et al. | 206/507 |
| 2012/0020746 A1* | 1/2012 | Astolfi et al. | 405/284 |
| 2012/0057932 A1* | 3/2012 | Marshall | 404/35 |
| 2012/0163911 A1* | 6/2012 | Culleton et al. | 404/41 |

\* cited by examiner

MODULATED STRUCTURAL CELL FOR SUPPORTING A TREE ROOT NETWORK

TECHNOLOGICAL FIELD

This invention relates to an arrangement which looks at accommodating the combined needs of trees, tree roots, storm water run off, pavements and walkways so that they can all co-exist in their interactions within the urban and suburban environment.

More particularly this invention relates to a modulated cell adapted to form a structural frame of said cells for support for a load bearing feature such as a pavement or walkway while at the same time providing a rooting area within the structural frame for a tree root network.

BACKGROUND ART

In order to make the urban and suburban environment more aesthetic but also more conducive to good healthy living, there is the need to introduce trees into the landscape.

Nonetheless it is well recognised that trees require a certain amount of space within these populated areas if they are going to develop into mature trees offering the benefits of shaded foliage, water retention, cooling, aesthetics and so forth to the surrounding area.

For the most part, town planning have seen the planting of trees in urban and suburban areas to grow in close proximity to pavements and walkways so that benefits of the trees can be enjoyed by those pedestrians utilising such places.

Nonetheless this is where the great conflict or competing demands begin to present themselves when trees are attempted to be placed in populated areas or positioned along pavements, walkways and so forth.

It is well recognised that the trees to successfully grow require rich nutrient soils with the appropriate levels of moisture and sufficient drainage to allow the tree's root system to pass there through.

Alternatively walkways or pavements require compact well supported soil structure to keep the positioned pavers or concrete in place thereby avoiding any structural damage to the construction.

Hence if trees are going to be planted in urban and suburban areas there seems to be a predicament as to whether or not one needs to look after the tree and therefore provide low compact soils suitable for root growth or alternatively compact soils which provide the necessary load bearing support for the pavement and make it unconductive for the root system of the tree to develop and therefore extend out or damage the pavement in any way.

In order to try and overcome these kinds of problems more recently systems have been introduced that accommodate tree rooting, pavement and side walk developments in close proximity and also potentially offering further functionality for storm water management.

FIG. 1 enclosed herewith provides such an example of how a modulated cell can create uncompacted soil volumes for large tree growths and also on site storm water management through the creation of a modular frame positioned about and below a load bearing feature such as a pavement and also within the tree root network.

Nonetheless problems with such an arrangement as the one depicted in FIG. 1 are quite numerous.

As the person skilled in the art will appreciate the rectangular crate type structure presented in FIG. 1 while it may have a lot of open spaces to accommodate a tree's root network, it does so at the expense of vertical stability of the frame structure when the cell frame is mounted vertically one upon the other.

Also the cell frame is made up of several independent components including the base, top plate and also the fastening means.

While there is some scope of the cell frame to be mounted vertically, albeit quite efficiently due to the amount of space in between the beams providing support, there is no inherent lateral fastening mechanisms to bring together adjacent cell frames to form a matrix type configuration.

Still further with so many individual components making up the cell frame it would be difficult to conveniently pack together a whole series of these frames during storage or transportation to their intended site for construction.

While further efforts have been made by others to provide similar cell frames again to try and create some stackable frame structure to provide load bearing support but also accommodate a tree's root network, these other attempts have not been able to create a balance between the requirement of the load bearing aspects of supporting the pavement without detrimentally affecting the usefulness of the frame structure in allowing the root network of the tree to pass there through.

While it may be possible to add further posts and beams and make the cell frame of reduced dimensions to the one illustrated in FIG. 1 this then takes away the benefit of open spaces and the like to allow the tree root network to pass there through and will also make the construction of the overall structural frame cumbersome, time consuming and expensive.

Therefore there clearly remains a need in this area of interest associated with being able to provide a feature which is open to accommodate the needs of both a tree but also those physical engineering requirements of an appropriately level load bearing soil structure to support important transport sections such as side walks or walkways that must be free of any hazards such as cracks or tree root intrusions.

Accordingly it is an object of this invention to provide a modulated cell which is adapted to form an improved structural frame which is able to provide support for a load bearing feature such as a pavement or walkway but at the same time adequately accommodate a rooting area for a tree.

Further objects and advantages of this invention including the ability of the same modulated cell structure to assist in storm water retention and the diversion of the storm water to underground tanks and so forth will become apparent from the complete reading of this specification.

SUMMARY OF THE INVENTION

Accordingly in one form of the invention there is provided a modulated cell adapted to form a structural frame of said cells for supporting a load bearing feature of a roadway, pavement or walkway while at the same time providing a rooting area within the structural frame for a tree root network, said cell including:

a main body with a top plate configured with vertical integral legs extending there from;

said top plate having regions upon its upper skirting for a snap fit fastening for receiving the ends of said legs of a resting cell thereupon said top plate to mount one cell vertically upon another;

said top plate further including along its peripheral edge an interlocking means for laterally joining together with adjacent cells;

such that a matrix of modulated cells can be mounted vertically and laterally one upon the other, and side by side fastened together without any external or additional securing attachments.

In preference the snap fit fastening means between the regions upon the upper skirting of the top plate of the main body of the cell and the vertical legs of another cell to be mounted or rested thereupon said cells one above the other, includes protrusions on one or either of the skirting region and/or the ends of the vertical legs and corresponding slots or grooves on either/or said regions upon the upper skirting of the top plate and said vertical legs.

In preference the regions upon the upper skirting of the top plate that receive the vertical legs of the upper cells to be rested or mounted thereupon includes the protrusions wherein the vertical legs include the slots or grooves which interengage with the corresponding protrusions to provide a frictional or fixable snap fit between the respective cells as they are mounted one upon the other.

In preference the interlocking means along the peripheral edge of the top plate of each modulated cell includes a curved shouldered flange and a corresponding extendable sleeve on an adjacent cell so that the two adjacent cells maybe be shouldered one within the other to prevent any lateral disengagement once the two adjacent modulated cells have been brought together.

An advantage of such an arrangement is that for the first time it is now possible to create a structural frame which will provide the necessary load bearing support for features such as pavements or walkways while at the same time appropriately provide the necessary area and spacing for the tree root network to pass there through.

The integrity of the frame structure made up of the modulated cells has been able to be maintained by the unique interconnecting of one cell one upon the other vertically and also side by side as they engage laterally.

The unique fixing arrangement of having the protrusions on the top plate forming a snap fit with the corresponding grooves or slots of the vertical legs extending from the cell above reinforces a strong vertical frame.

The same to for the unique lateral interlocking means between adjacent cell frames provided by the curved shoulder which once pressure is in fact placed upon the frame vertically this further engages or brings together the lateral fastening fix to create a stable structure.

Advantageously soil can now be introduced into the modulated cell structure and it no longer needs to be compacted down as it will be the frame structure per se which will be supporting the pavement rather than compact soils.

Advantageously in this arrangement there is no requirement to include extra pieces in joining together the modulated cells to create the frame matrix.

Fastening means to join one cell upon the other in its mounted vertical position is attributed to the actual design of the protrusions extending from the skirting of the top plate and those corresponding grooves and slots within the ends of the vertical legs extending from an adjacent top plate of another modulated cell.

In preference the vertical integral legs extending from the top plate of the modulated cell are hollow.

An advantage of such an arrangement is that this single integral modulated cell can be easily stacked or nested one into the other and compacted down during storage or transport before use.

In preference the vertical integral leg extensions from the top plate include holes, apertures or openings configured so as to provide access area for water or plant material to pass there through.

In preference the top plate is of a octagonal configuration with four symmetrically positioned recesses about the top plate wherein said recesses are able to accept there through corresponding legs of another modulated cell which has been nested inside one cell with another in order to stack a series of modulated cells during storage and/or transport.

In preference symmetrically placed in between four recesses extending about the top plate are the protrusions upon the upper skirt of the top plate which engage with the corresponding grooves of the vertically integral leg extensions from a top plate of another modulated cell which would be stacked there upon said cell.

An advantage of such an arrangement is that the top plate by its symmetrical arrangement of both the recesses and the protrusions means that the top plate offers functionality of not only supporting one modulated cell upon another when the frame needs to be constructed but also advantageously the means to accept another modulated cell when it needs to nest or rest inside said modulated cell in order to provide a compact stacked arrangement of a plurality of said modulated cells during storage, transport and so forth.

Advantageously the design provided for and introduced generally above and to be presented shortly hereafter in a detailed preferred embodiment will have high compressive load capacity with an advanced computer modelling and extensive FEA testing to produce a design with maximum load bearing strength.

Advantageously the module's own connecting features secure one modulated cell both vertically and laterally from within the frame work for ultimate strength of an entire assembled matrix.

Manufacturing times and costs have been improved wherein fast cycle times have been enabled due to tooling design with rapid assembly times available due to the modular size and self connection tabs that are inherently a part of the modulated cell.

While the arrangement provides a reinforced structural frame the open spaces there within have been maximised.

In order now to define the invention in greater detail a preferred embodiment will be presented herewith. The assistance of a series of illustrations and accompanying text.

Nonetheless this preferred embodiment should not be considered to restrict the scope of the invention in any way of which has been described generally above.

BRIEF DESCRIPTION OF THE ILLUSTRATIONS

Figure 2:
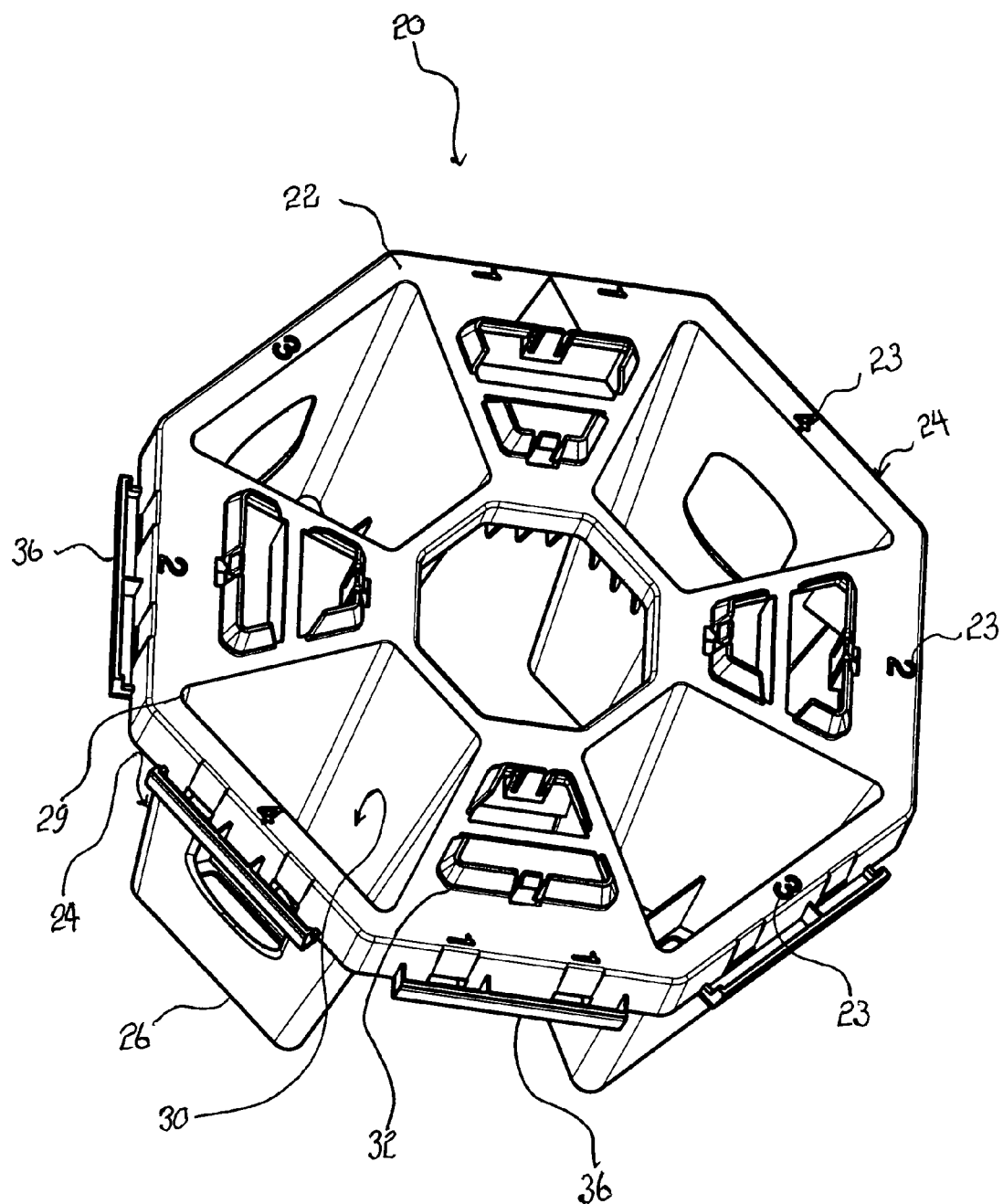
Figure 3:
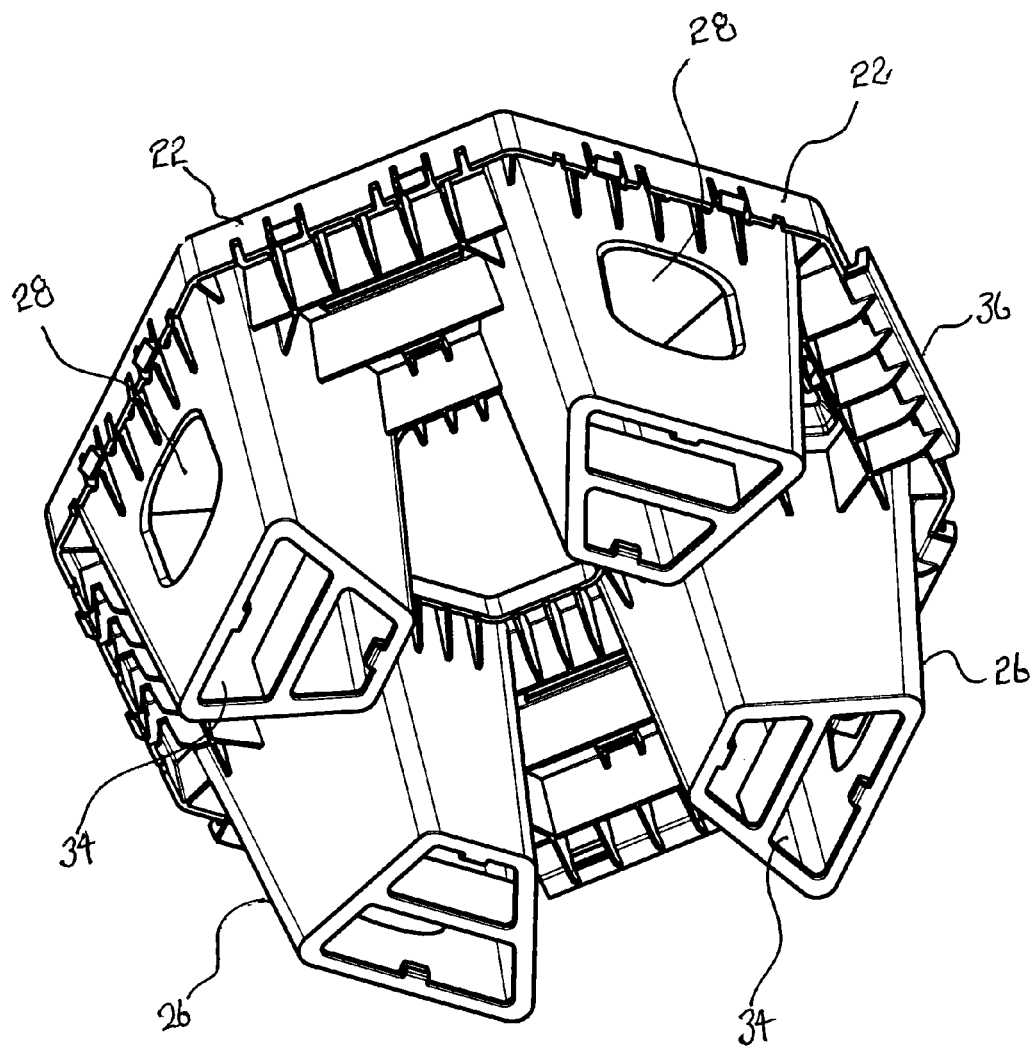
Figure 4:
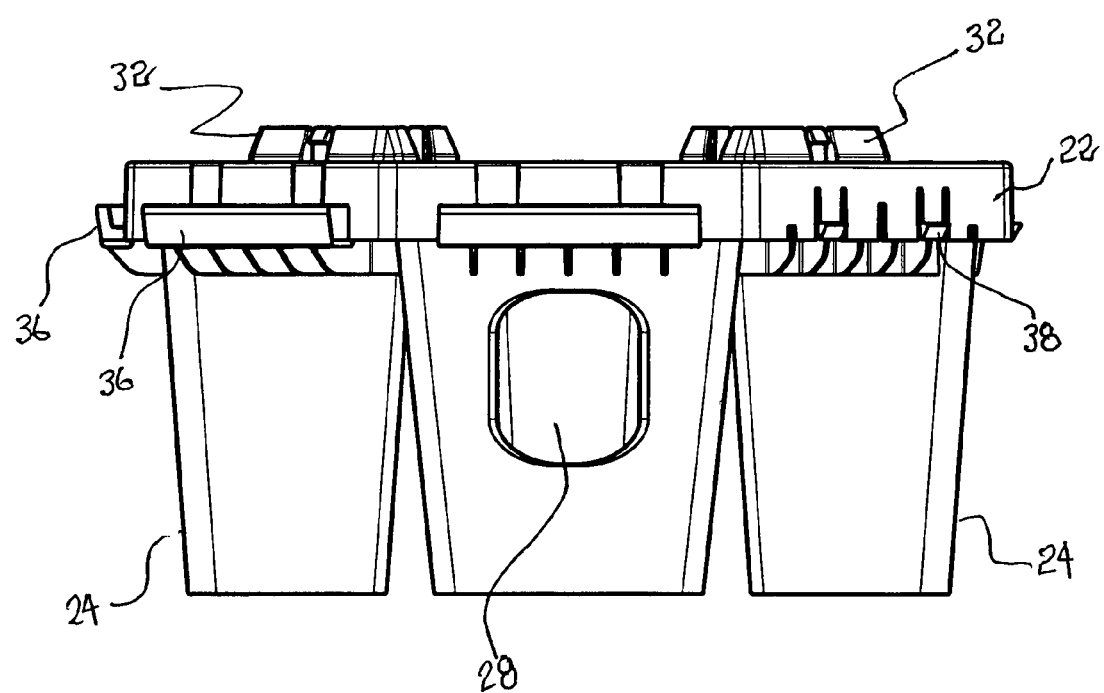
Figure 5:
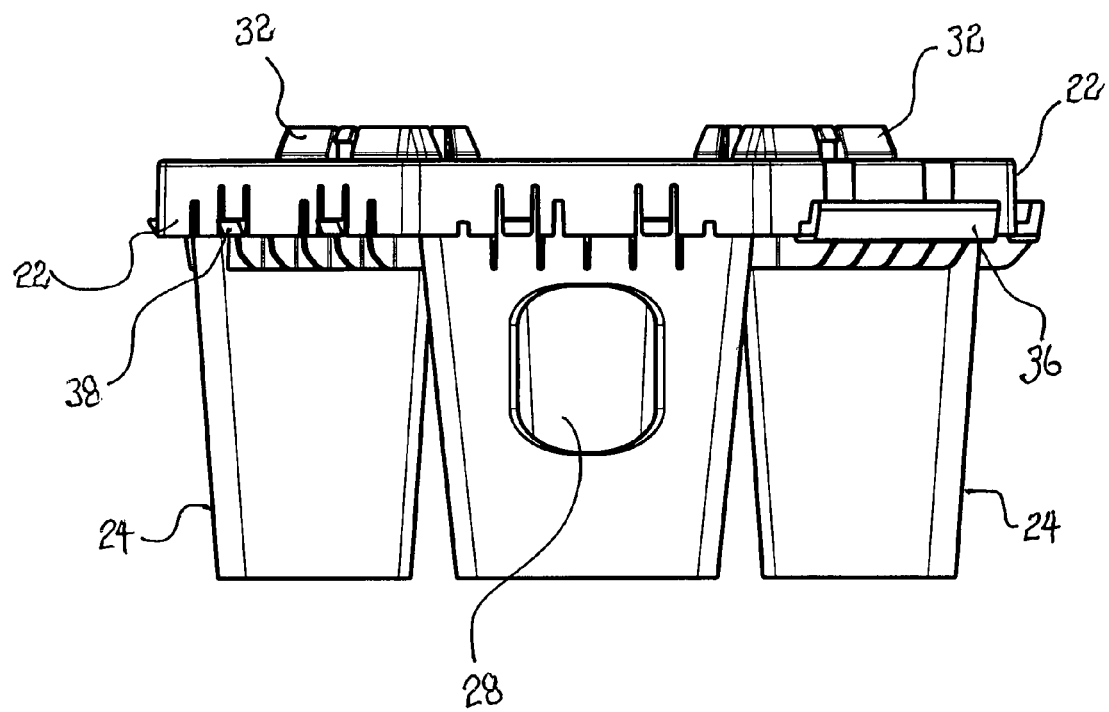
Figure 6:
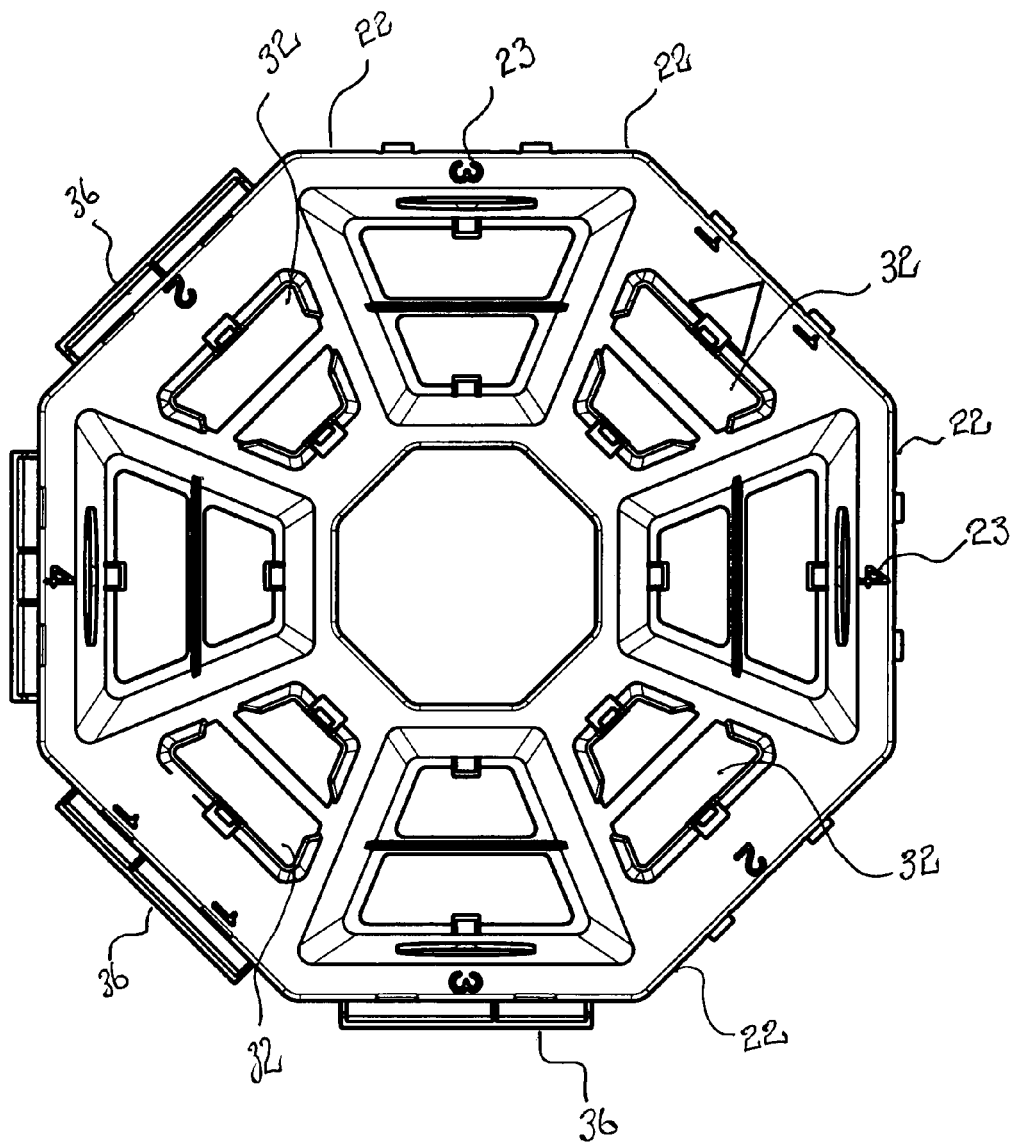
Figure 7:
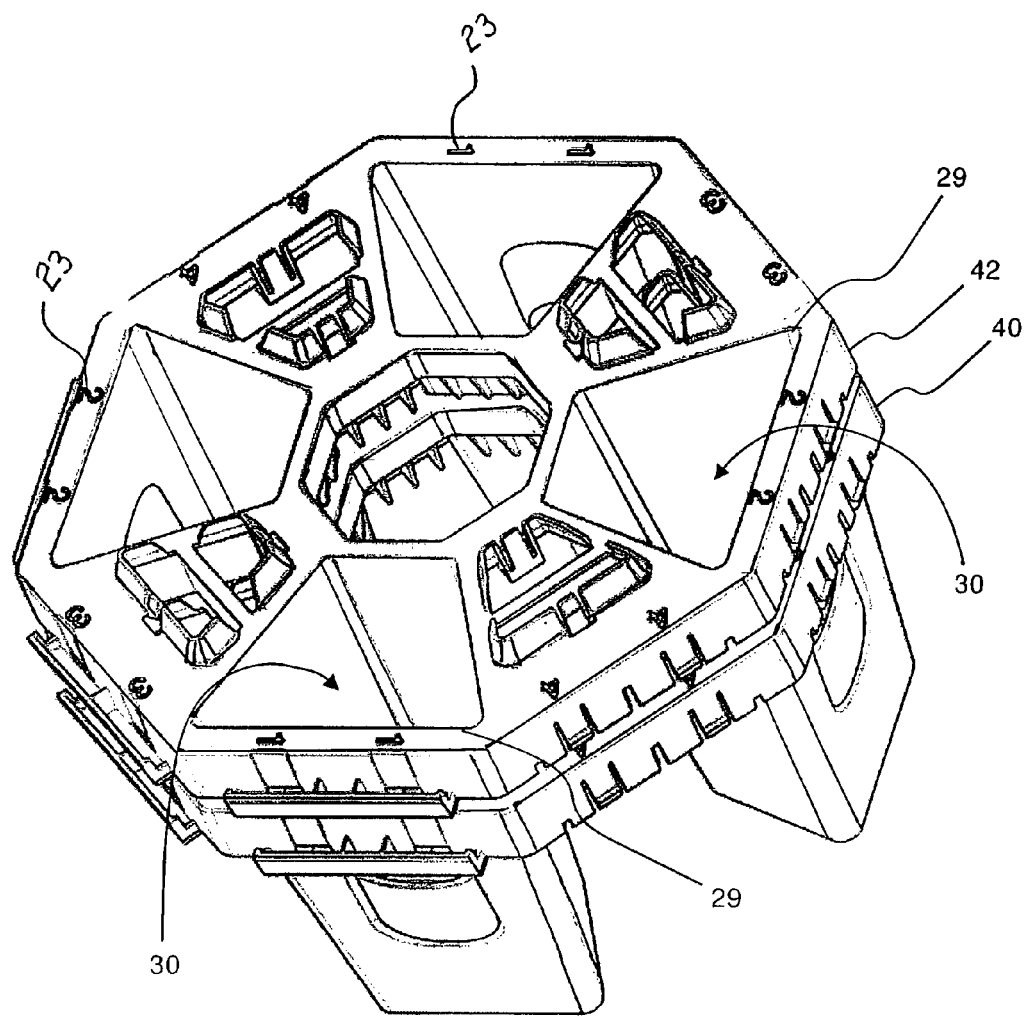
Figure 8:
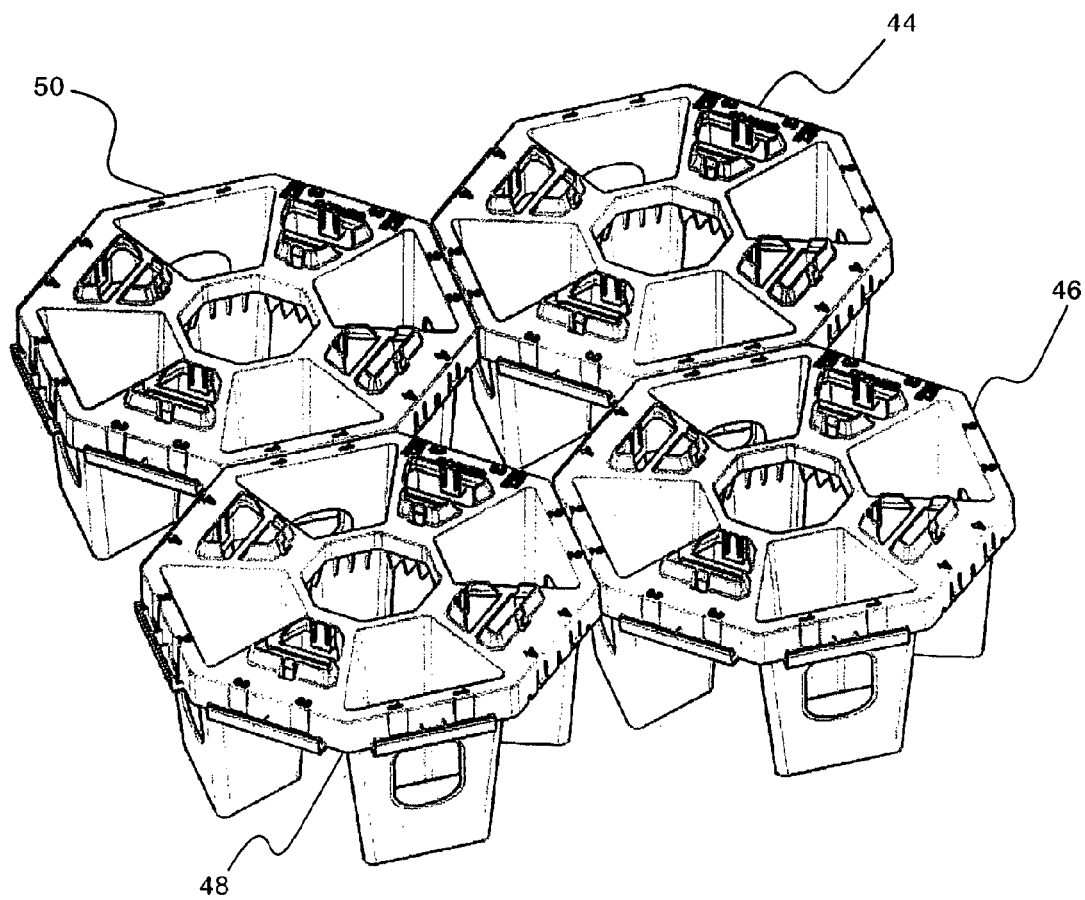

FIG. 1 is a perspective view of a prior art modulated cell.
FIG. 2 is a perspective view of the modulated cell which is adapted to form a structural frame and preferred embodiment of this invention.
FIG. 3 is the same modulated cell of FIG. 1 but from a perspective from the bottom.
FIG. 4 is the representation of FIG. 1 showing a front view.
FIG. 5 is a representation of FIG. 1 showing a back view.
FIG. 6 is a representation of FIG. 1 showing a top view.
FIG. 7 is a perspective view showing the functionality of the modulated cell by allowing a plurality of cells to be nested or rested therein another to provide a compact arrangement during storage and transportation.
FIG. 8 shows a perspective view as to how modulated cells can form a layer within a structural frame.

Figure 9:
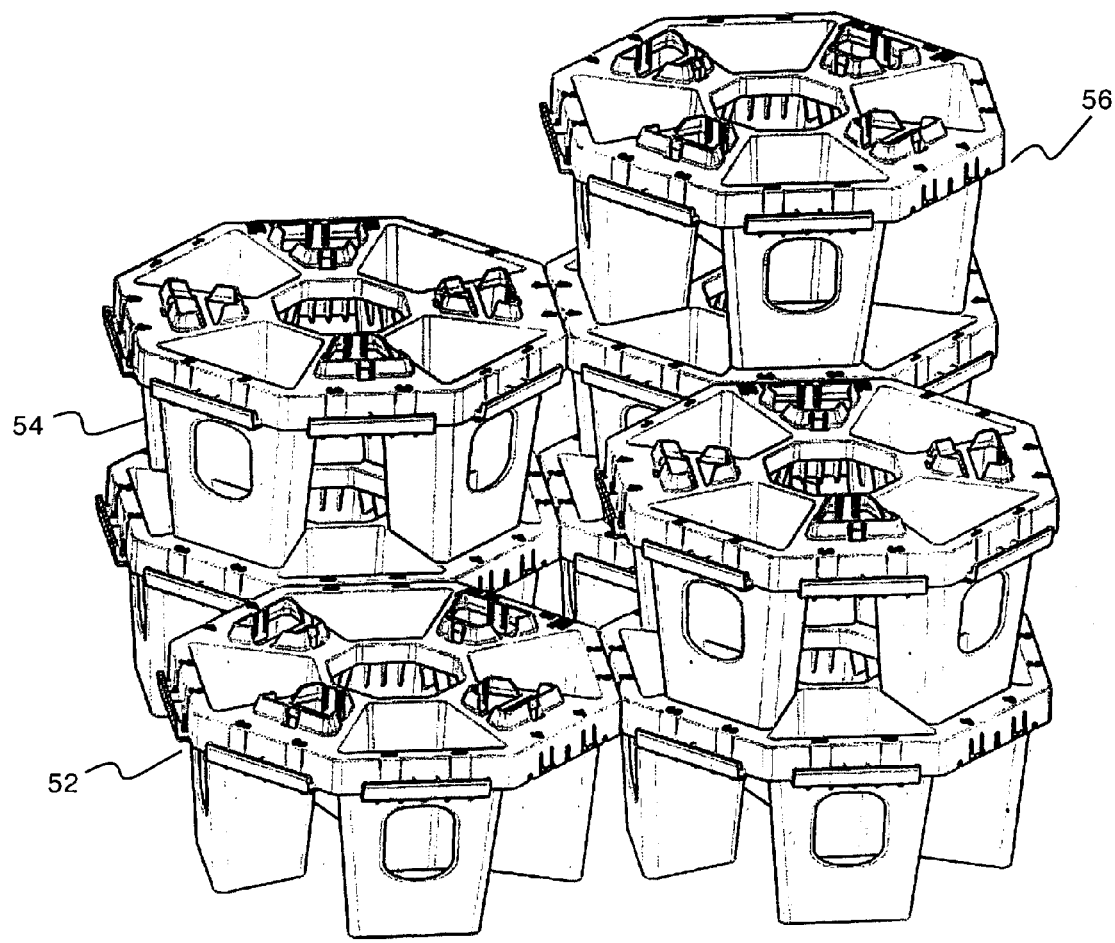

FIG. 9 shows a schematic representation of how the structural frame can be created utilising the modulated cell of the preferred embodiment of this invention.

DETAILED DESCRIPTION OF THE ILLUSTRATIONS

Referring to the drawings now in greater detail and as introduced preceedingly, FIG. 1 simply provides a representation of other modulated cell arrangements in the market place, of which have deficiencies to which this current invention overcomes.

As seen in FIG. 1 the modulated cell 10 includes a base member 12 with vertical support columns or posts 14 which then joins together with a top plate 16 which requires independent fastening bolts or screws 18 in order to make the necessary secured attachment.

This modulated cell comes with a variety of independent components and is not a universal single integral product.

It has no means of laterally interconnecting extending columns and the vertical structure by placing one frame upon the other lacks significant vertical strength due to the amount of spacing within the overall design of the modulated cell.

FIGS. 2, 3, 4, 5 and 6 show the preferred modulated cell of this invention.

Shown generally as 20 the modulated cell includes a top plate 22 which has a general octagonal configuration that includes eight numbered sides shown generally as 24.

The numbering system shown on the top plate from 1 to 4 allows a simple and convenient way in which a corresponding modulated cell can be interconnected laterally with said modulated cell to create a layer of the structural frame being created by the modulated cells 20.

The top plate includes a series of recesses 29 which opened up hollow chambers 30 of each of the respective integral vertical legs extending from the top plate 22.

Numbers 1, 2, 3 and 4 represented generally as 23 in the illustrations provide a visual means in which corresponding sections of an adjacent cell can be aligned up.

The top plate also includes intermittently in between recesses 29 protrusions 32 which are adapted to slot in and frictionally or snap fit engage corresponding grooves or slots 34 at the end of the leg extensions 26.

Lateral fastening or connecting points to engage one modulated cell with an adjacent lateral positioned modulated cell are achieved by the features shown generally as 36 and 38 on the top plate 22 of the modulated cell 20.

Openings 28 on the vertical extending legs 26 also provide means in which the structure can remain open but at the same time as they are configured within the construction of the vertical legs 26 the force or the strength of the structural frame does not lose any integrity.

FIG. 7 shows a representation whereby modulated cells 40 and 42 can be stacked one on top of the other in a nesting configuration thereby dramatically being able to save space in the storage and transportation of the modulated cell.

The unique arrangement of having the top plate provide the functionality of not only the support of being able to mount the vertical legs upon its top surface when a structural frame needs to be constructed, but also conversely the interaction of the defined recesses 29 that introduce a hollow chamber 30 of the vertical legs 26 means that when the modulated cells need to be stored or transported they can simply be packed compactly one into the other which is a significant space saving.

FIGS. 8 and 9 show how the modulated cells can be joined together using the vertical and lateral securing arrangements discussed previously of which allow secure attachment between one modulated cell to another without the need of any additional fastening components.

As discussed previously the fastening means of engaging one modulated cell with another both from a vertical perspective and also laterally across a layer of the structural frame is being able to be achieved by inherent features that are part of the actual design and configuration of each individual modulated cell.

FIG. 8 shows construction of one layer of the structural frame when modulated cells 44, 46, 48 and 50 can be joined as illustrated.

As also shown the numbering system used on the top plate along with identification of information such as corner side and so forth assists in making the assembling of the structural frame straightforward and without any real necessary acquired trade skills.

FIG. 9 just takes the representation of FIG. 8 slightly further wherein the bottom layer 52 can then be added upon vertically by introducing additional layers 54 and 56 of the respective modulated cells.

The invention claimed is:

1. A single piece modulated cell adapted to form a structural frame of said cells for supporting a load bearing feature of a roadway, pavement or walkway while at the same time providing a rooting area within the structural frame for a tree root network, said cell Including:
    a top plate configured with hollow vertical legs extending there from, each vertical integral leg includes an opening at the top plate so that hollow vertical legs of another modulated cell may rest therein when said modulated cells are required to be nested one in another;
    said top plate having regions upon its upper skirting for a snap fit fastening arrangement for receiving the ends of said hollow vertical legs of another modulated cell resting thereupon said top plate so as to fixedly mount a modulated cell vertically upon another, said regions being located adjacent said opening of each hollow vertical leg so that the regions are symmetrically placed between the openings for receiving the hollow legs of another modulated cell therein;
    said hollow vertical legs further Including holes, apertures or openings configured so as to provide access area for water or plant material to pass there through;
    said top plate further Including along its peripheral edge an interlocking means for laterally joining together with adjacent cells;
    such that a matrix of modulated cells may be formed by mounting vertically one modulated cell upon the other whereby the hollow vertical legs of one cell are aligned with and rest upon the regions upon an upper skirting of a top plate of another cell, and laterally side by side one modulated cell with another with all modulated cells fastened together without any external or additional securing attachments.

2. The single piece modulated cell of claim 1 wherein the snap fit fastening arrangement between the regions upon the upper skirting of the top plate and the hollow vertical legs of another modulated cell to be mounted or rested thereupon said cells one above the other, includes protrusions on one or either of the skirting region and/or the ends of the hollow vertical legs and corresponding slots or grooves on either/or said regions upon the upper skirting of the top plate and said hollow vertical legs.

3. The single piece modulated cell of claim 2 wherein the regions upon the upper skirting of the top plate that receive the hollow vertical legs of the upper cells to be rested or mounted thereupon Includes protrusions wherein the hollow vertical legs Include the slots or grooves which interengage with the corresponding protrusions to provide a frictional or fixable snap fit between the respective cells as they are mounted one upon the other.

4. The single piece modulated cell of claim 1 wherein the interlocking means along the peripheral edge of the top plate of each modulated cell includes a curved shouldered flange and a corresponding extendable sleeve on an adjacent cell so that the two adjacent cells maybe be shouldered one within the other to prevent any lateral disengagement once the two adjacent modulated cells have been brought together.

5. The single piece modulated cell of claim 1 wherein the top plate is of an octagonal configuration having four openings symmetrically positioned about the top plate for accepting there through corresponding legs of another modulated cell which has been nested inside one cell with another in order to stack a series of modulated cells during storage and/or transport.

6. The single piece modulated cell of claim 5 wherein symmetrically placed in between the four openings extending about the top plate are the regions upon the upper skirt of the top plate which engage with the ends of the vertical integral legs from a top plate of another modulated cell which would be stacked there upon said cell.

* * * * *